US010606884B1

(12) United States Patent
Mongrain et al.

(10) Patent No.: US 10,606,884 B1
(45) Date of Patent: Mar. 31, 2020

(54) TECHNIQUES FOR GENERATING REPRESENTATIVE IMAGES

(71) Applicant: Amazon Technologies, Inc., Reno, NV (US)

(72) Inventors: Scott Allen Mongrain, Seattle, WA (US); Sunil Ramesh, San Jose, CA (US); Whitney Gale Spathelf, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 350 days.

(21) Appl. No.: 14/973,535

(22) Filed: Dec. 17, 2015

(51) Int. Cl.
*G06F 16/583* (2019.01)
*G06F 16/51* (2019.01)
*G06F 16/28* (2019.01)

(52) U.S. Cl.
CPC .......... *G06F 16/583* (2019.01); *G06F 16/285* (2019.01); *G06F 16/51* (2019.01)

(58) Field of Classification Search
CPC .......... G06F 17/30247; G06F 17/3028; G06F 17/30598; G06K 9/6218; G06K 9/6219; G06K 9/622; G06K 9/6221; G06K 9/6222; G06K 9/6223; G06K 9/6224; G06K 9/6226; G06K 9/4614
See application file for complete search history.

(56) References Cited

U.S. PATENT DOCUMENTS

| 5,764,790 | A | * | 6/1998 | Brunelli | G06K 9/00221 |
| | | | | | 382/118 |
| 5,894,333 | A | * | 4/1999 | Kanda | G06F 17/30811 |
| | | | | | 348/564 |
| 10,062,173 | B1 | * | 8/2018 | Padfield | G06Q 30/0643 |
| 10,346,901 | B1 | * | 7/2019 | Serbanescu | |
| 2003/0113017 | A1 | * | 6/2003 | Thomas | G06F 17/30256 |
| | | | | | 382/181 |
| 2007/0086667 | A1 | * | 4/2007 | Dai | G06K 9/342 |
| | | | | | 382/242 |
| 2008/0077569 | A1 | * | 3/2008 | Lee | G06F 17/30713 |
| 2008/0268876 | A1 | * | 10/2008 | Gelfand | G06Q 30/02 |
| | | | | | 455/457 |
| 2010/0073519 | A1 | * | 3/2010 | Onoe | G06F 17/30781 |
| | | | | | 348/231.99 |
| 2011/0147588 | A1 | * | 6/2011 | Chaudhuri | G06T 5/50 |
| | | | | | 250/334 |

(Continued)

OTHER PUBLICATIONS

Liu, Xiaobing, and Bo Zhang. "Automatic collecting representative logo images from the Internet." Tsinghua Science and Technology 18, No. 6 (2013): 606-617. (Year: 2013).*

(Continued)

*Primary Examiner* — Jesse P Frumkin

(74) *Attorney, Agent, or Firm* — Hogan Lovells US LLP

(57) ABSTRACT

Techniques for generating representative images are disclosed herein. In particular, various embodiments utilize an image generation service to generate representative images for categories and sub-categories of objects. Each representative image can be a stylized depiction of an aggregated image corresponding to a particular category of objects. A user can refine the search, or continue to browse, by selecting one of the representative images. This enables users to quickly identify features the user is looking for or would like to exclude, by depicting the sort of objects associated with that category.

18 Claims, 10 Drawing Sheets

(56) References Cited

U.S. PATENT DOCUMENTS

| | | | | |
|---|---|---|---|---|
| 2013/0064460 A1* | 3/2013 | Zhang | ................ | G06K 9/00677 |
| | | | | 382/225 |
| 2013/0222696 A1* | 8/2013 | Yamazaki | .......... | G06K 9/00536 |
| | | | | 348/571 |
| 2014/0126826 A1* | 5/2014 | Yabu | ...................... | G06Q 30/06 |
| | | | | 382/190 |
| 2014/0363075 A1* | 12/2014 | Li | ...................... | G06F 17/30274 |
| | | | | 382/159 |
| 2015/0169634 A1* | 6/2015 | Li | ........................ | G06F 17/3028 |
| | | | | 707/723 |
| 2015/0169635 A1* | 6/2015 | Jing | .................. | G06F 17/30867 |
| | | | | 707/723 |
| 2015/0169994 A1* | 6/2015 | Chinen | ................ | G06K 9/6215 |
| | | | | 382/218 |
| 2015/0317540 A1* | 11/2015 | Chinen | ................ | G06F 16/532 |
| | | | | 382/103 |
| 2016/0004695 A1* | 1/2016 | Yang | ................ | G06F 17/30247 |
| | | | | 707/738 |
| 2016/0232234 A1* | 8/2016 | Baek | ................ | G06F 17/30793 |
| 2017/0293958 A1* | 10/2017 | Tang | ........................ | G06K 9/00 |
| 2018/0060935 A1* | 3/2018 | Dhua | .................... | G06K 9/6202 |
| 2018/0197302 A1* | 7/2018 | Yu | ........................... | G06T 11/00 |

OTHER PUBLICATIONS

Kennedy, Lyndon S., and Mor Naaman. "Generating diverse and representative image search results for landmarks." In Proceedings of the 17th international conference on World Wide Web, pp. 297-306. ACM, 2008. (Year: 2008).*

* cited by examiner

TECHNIQUES FOR GENERATING REPRESENTATIVE IMAGES

BACKGROUND

Electronic devices are increasingly enabling users to locate information in different ways. For example, a user wanting information about an item can perform an Internet search to locate information about the item. In addition, a user can browse for information online that is organized into various categories. Much of the information can be represented graphically, enabling users to browse from category to category, or among sub-categories, by image. However, not all similarly categorized information can be easily represented graphically. For example, a photograph of a popular item may be used to represent a category of items, which may mislead users into thinking that all items in that category look like that item, are produced by that item's manufacturer, etc.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to refining searching using multimedia inputs. In particular, various embodiments utilize an image generation service to generate representative images for categories and sub-categories of objects. For example, an initial search query can be received from a user. The initial search query can be a text, image, video, or other multimedia search. Categories of content can be displayed in response to the query. Each category can be displayed with a representative image, generated based on images of content in that category. The representative image can be a stylized depiction of an aggregated image. A user can refine the search, or continue to browse, by selecting one of the representative images. This enables users to quickly identify features the user is looking for or would like to exclude, by depicting the sort of objects associated with that category.

Various other functions and advantages are described and suggested below as may be provided in accordance with the various embodiments.

Figure 1:
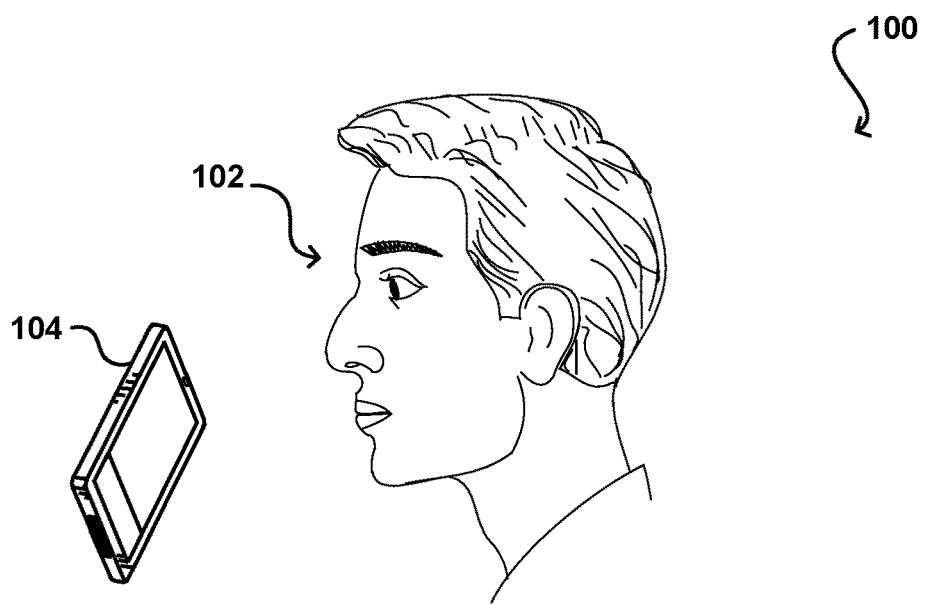
FIG. 1 illustrates a traditional search example environment.
Figure 1:
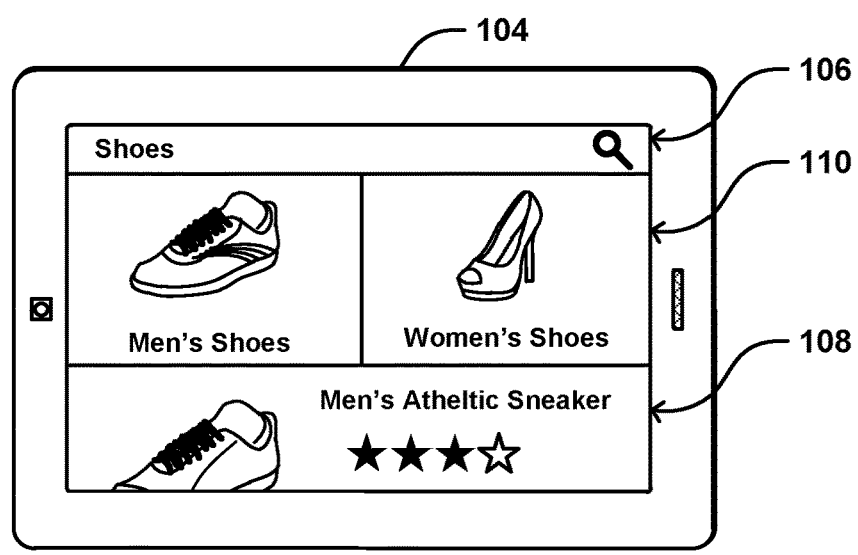

FIG. 1 illustrates a traditional search example environment 100. In this example, a user 102 is searching for various items using computing device 104. Using an appropriate application executing on computing device 104, the user is able to enter a search query 106 and obtain a list of matching items 108. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others.

In this example, the user enters a text search query 106 "Shoes" and matching results 108 are shown. Since the search is broad, the user may be searching for a particular style of shoe, color, pattern, or other feature. As such, suggested searches 110 may also be presented. These suggested searches may be represented graphically and may be determined based on queries other users who have searched for "Shoes" have subsequently performed. For example, suggested searches 110 include Men's Shoes and Women's Shoes, each accompanied by an image of a shoe in that category. The accompanying images may be associated with popular or commonly viewed items from those categories. However, based on the images shown, a user may assume that selecting one of those suggested searches will be too narrow, for example by searching for women's dress pumps or men's athletic shoes.

Figure 2:
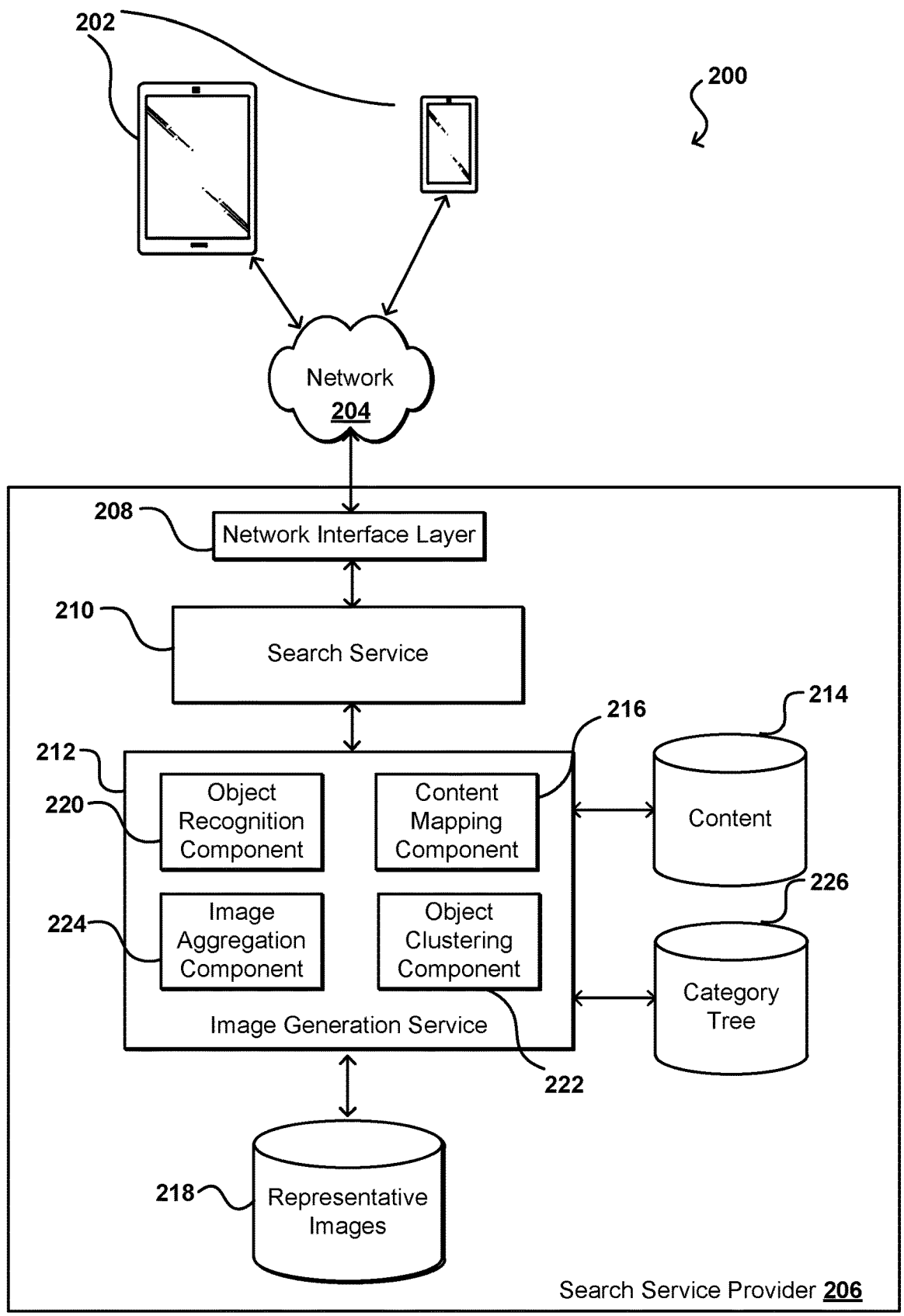
FIG. 2 illustrates an example system for generating representative images in accordance with various embodiments.

FIG. 2 illustrates an example system 200 for generating representative images in accordance with various embodiments. In this example, a user of a computing device 202 is able to provide information relating to an item of interest. Although portable computing devices 202 are shown in this example, other computing devices such as laptop computers, desktop computers, wearable computers, and other computing devices may also be used. This can involve providing a search input such as inputting a text query, drawing a graphical input, capturing an image or video of an object using an image capture device of the computing device 202, uploading an existing image or video of an object, capturing audio data related to a search, etc. The search input, which can include image, video, or text information, among other such options, can be transmitted from the computing device 202 across at least one appropriate network 204 to a search service provider 206. Search service provider 206 can provide search services associated with a website, a database or other data store, one or more local or remotely connected computing systems, or other searchable system. The network 204 can be any appropriate network, such as may include the Internet, a local area network (LAN), a cellular network, and the like. The request can be sent to an appropriate search service provider 206, as may provide one or more services, systems, or applications for processing such requests. The information can be sent by streaming, uploading, or otherwise transferring the information using at least one appropriate communication channel.

In this example, the request is received to a network interface layer 208 of the search service provider 206. The network interface layer 208 can include any appropriate components known or used to receive requests from across a network, such as may include one or more application programming interfaces (APIs) or other such interfaces for receiving such requests. The network interface layer 208 might be owned and operated by the provider, or leveraged by the provider as part of a shared resource or "cloud" offering. The network interface layer can receive and analyze the request, and cause at least a portion of the information in the request to be directed to an appropriate system or service, such as a search service 210. A search service in this example includes components operable to receive a query (e.g., image, video, audio, etc.), analyze the query, communicate the query to one or more data stores to be searched, and return results. Search service 210 can communicate with an image generation service 212 that is configured to generate representative images associated with the search results. Although embodiments are described herein with respect to a search service provider, an image generation service can be used in other contexts.

In some embodiments, image generation service 212 can receive requests from various services, such as search service 210, to generate a representative image based on a set of content images. The representative image can generated by aggregating the set of content images. In some embodiments, the request can include the set of images, or can include a reference (such as a link, URL, or other location identifier) to the set of images. As shown in FIG. 2, the set of images can be stored locally in a content store 214 or can be retrieved from a remote data store. In at least some embodiments, when a request is received, image generation service 212 can determine whether a representative image has been previously generated using a content mapping component 216. Content mapping component 216 can maintain an index of content 214 to representative images 218, and may include past queries, content image sets, and other data associated with each representative image 218. If a matching representative image, or images, is identified, it can be returned to the requesting service.

If no matching representative image is identified, image generation service 212 can analyze each image in the set of content images using an object recognition component 220 that is configured to identify objects in image data. Object recognition component 220 can identify objects based on various visual characteristics, such as shape, texture, pattern, color, etc. For example, object recognition component 220 can identify an outline of each object shown in an image by creating edge images of each image. It should be appreciated that edge images may be created using any techniques and methods known in the art, such as edge detection algorithms that use Canny edge detection or Sobel operators. The shape of each object in the edge images may then be characterized (e.g., using feature points to identify shape histograms) such that the shapes of the objects in the images can be compared.

In various embodiments, image generation service 212 can include an object clustering component 222 to identify clusters of objects that share similar visual characteristics. Object clustering component 222 can implement any clustering technique, such as k-means clustering, to determine one or more clusters of images from the set of images. For example, objects may be clustered based on shape, texture, pattern, color, or other visual characteristic. In some embodiments, object clustering component 222 can include one or more object classifiers which may be trained to identify particular visual characteristics. For example, where objects are clustered by shape, object classifiers may be trained to identify orientations of objects. These classifiers may be used to sort objects based on their orientations. This sorting can ensure that the objects are shown from a similar perspective.

In some embodiments, image aggregation component 224, can generate an aggregate image from the set of images. The aggregate image may be generated by averaging the images from the set of images. In some embodiments, a difference metric can be calculated for each image from the set of images which indicates how different the image is from the aggregate image. One or more difference thresholds may then be used to remove outlier images from the set of images. In some embodiments, a standard deviation or other measure of deviation across the difference metrics can be calculated. If the standard deviation is above a deviation threshold value, the difference threshold may be adjusted to increase the number of images removed from the image set. When the deviation threshold is met, a second aggregate image can be generated for the reduced image set. This second aggregate image may then be stored as a representative image 218 for that image set.

In some embodiments, a similarity metric may be calculated which indicates how similar an image is to the aggregate image. One or more similarity thresholds may be used to remove outlier images having a similarity metric less than a threshold Similar statistical techniques as discussed above with respect to difference metrics may be used to determine the deviation of similarity metrics across the image set. If a deviation metric is below a deviation threshold then the second aggregate image may be generated.

In some embodiments, image aggregation component 224 can apply one or more transforms to the aggregate image when storing the aggregate image as a representative image. For example, one image, such as a photograph, outline image, or other image, of an object can be compared to a second image of that same object. The second image can be, e.g., an artist's rendering or other stylized depiction of the object. The image aggregation component 224 may then determine a set of transformations by comparing the first image to the second image that captures that style of depiction. These transforms can then be applied to each representative image, to provide each image with a common style. In some embodiments, the transformations may be received from a third party source and/or created using known image processing techniques.

In at least some embodiments, content 214 may be organized into various categories. The content may be organized by the content provider, by a user, or by another system or service. In some embodiments, content 214 may be arranged hierarchically in a category tree 226 as described below in more detail with reference to FIG. 3. As described further below, representative images 218 may be generated for each category and/or sub-category of content in category tree 226.

In some embodiments, representative images may be generated periodically to account for changes to content 214. For example, as content changes (e.g., as new content items are added and/or as content items are removed) a previously generated representative image may no longer be representative of the content. In some embodiments, particular categories of content may change at predictable rates. To accommodate these changes, a category may be associated with an update policy. The update policy may include one or more update events which when detected cause a new representative image to be generated for that category. For example, an update policy may define a time period since the last generation of a representative image for that category. Additionally, or alternatively, the update policy may define a number of changes (e.g., additions of content items and/or deletions of content items) from a category of content which triggers generation of a new representative image.

Figure 3:
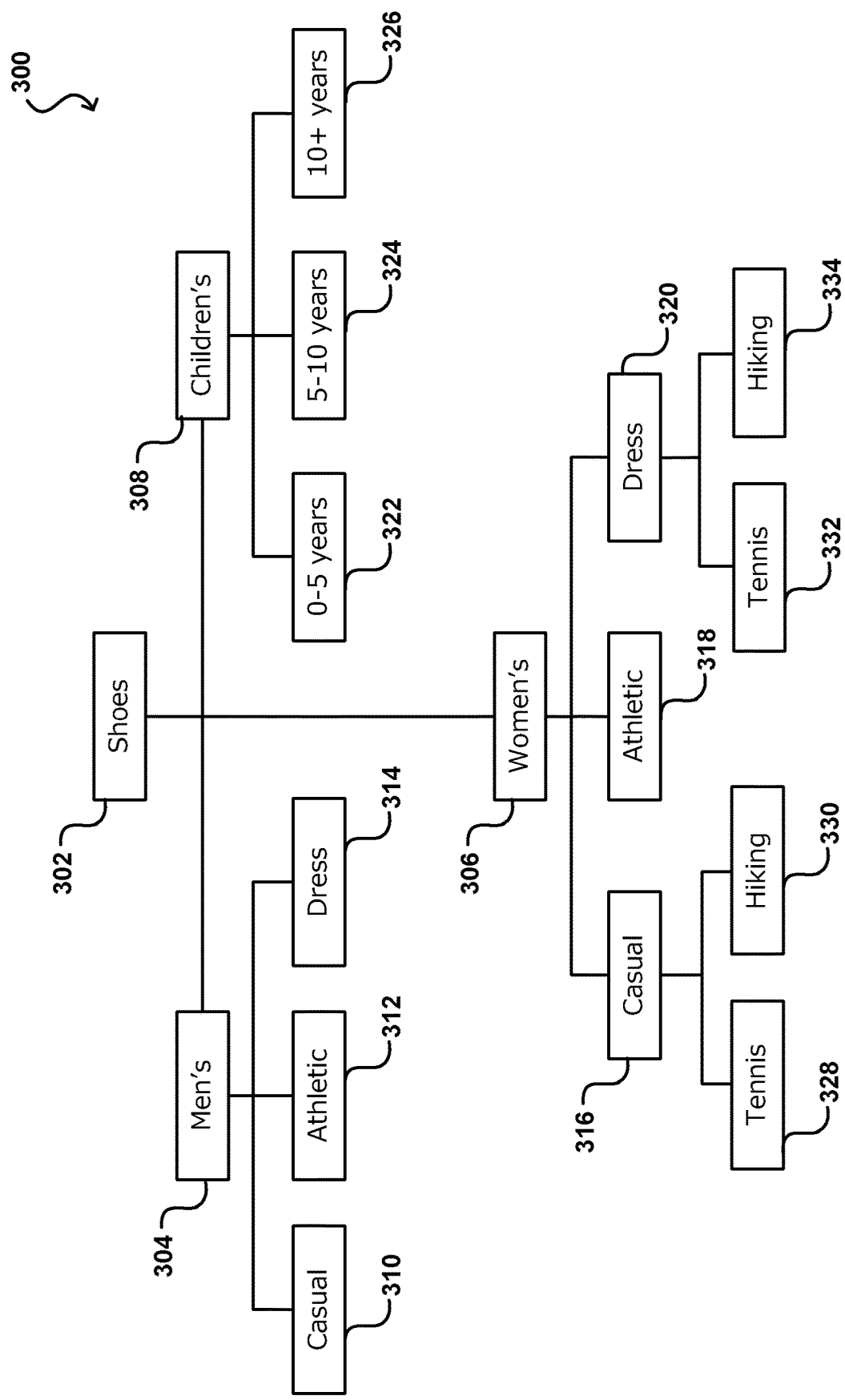
FIG. 3 depicts aspects of an example category tree in accordance with at least one embodiment.

FIG. 3 depicts aspects of an example category tree 300 in accordance with at least one embodiment. As discussed, a representative image may be generated for each category shown in category tree 300. In the example category tree 300, a root or highest level category 302 categorizes, references and/or includes (collectively, "categorizes") content (e.g., images) corresponding to a particular type of object (e.g., shoes). A next lower (i.e., second) level of the category tree 300 includes three sub-categories 304, 306, 308 of the root category 302. The three sub-categories 304, 306, 308 categorize content in the collection of content corresponding to demographic categories of users of the physical object, i.e., men's shoes, women's shoes and children's shoes, respectively.

A next lower (i.e., third) level of the category tree 300 includes three sub-categories 310-314, 316-320, 322-326 for each of the categories 304, 306, 308 of the previous level. Two of the sets of third level sub-categories 310-314 and 316-320 are duplicates categorizing content in content corresponding to a purpose and/or role of the physical object with respect to the demographic of the parent category 304, 306, i.e., shoes appropriate for casual, athletic and dress situations for men and women, respectively. The third set of third level sub-categories 322-326 categorizes content in the collection of content 206 corresponding to a refinement of the parent demographic category 308, i.e., shoes appropriate for children aged 0-5 years, 5-10 years and 10+ years, respectively.

A next lower (i.e., fourth) level of the category tree 300 includes illustrative pairs of sub-categories 328-334. Pair 328-330 sub-categorize a particular purposed-based category 316, e.g., athletic shoes designed for tennis 328, and athletic shoes designed for hiking 330. A second pair 332-334 categorizes content corresponding to a shape and/or form of the physical object with respect to the purposed-based parent category 320, i.e., pumps and flats, respectively.

Figure 4:
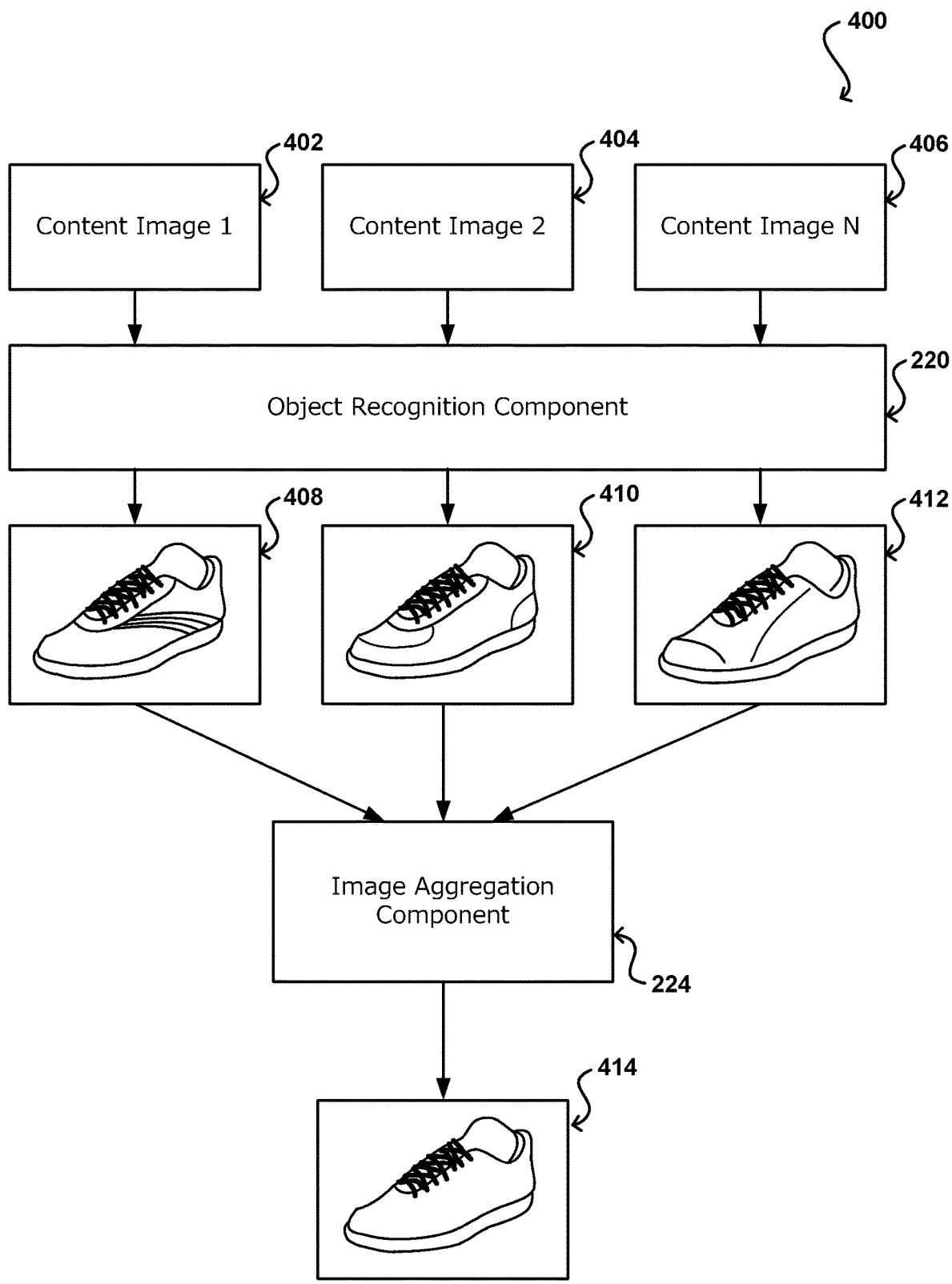
FIG. 4 illustrates an example of generating a representative image in accordance with various embodiments.

FIG. 4 illustrates an example 400 of generating a representative image in accordance with various embodiments. Although this example is described with respect to generating a representative image based on shape, images may be aggregated based on any visual characteristic such as color, texture, pattern, etc. As shown in FIG. 4, various content images 402, 404, 406 can be received by an image generation service 212. These images may be product photographs, artistic renderings, or other depictions. Object recognition component 220 can analyze each image and generate a corresponding edge image 408, 410, 412. As shown in FIG. 4, these images include images of shoes, which may be categorized as men's athletic shoes 312. The edge images capture the general shape of the objects (e.g., in the example shoes) shown in each image 402, 404, 406. Image aggregation component 224 can then generate an average image 414 from the edge images 408, 410, 412. As shown in FIG. 4, the average image maintains and/or enhances those features that are common to the images, such as the general shape, laces, etc., while diminishing and/or removing features that vary between each image, such as stripes, contours, cap toes, etc. The resulting aggregate image 414 can then be stored as a representative image for the category Men's Athletic Shoes 312.

As discussed, a representative image may be associated with a particular category of content. In some embodiments, a representative image may be analyzed to identify various visual characteristics. These visual characteristics may be used as representative filters for the content items in the particular category. This provides additional descriptors of the content items extracted from the visual appearance of the content items, rather than as provided by another user or system, and may be used to serve more accurate search results in response to future queries.

Figure 5A:
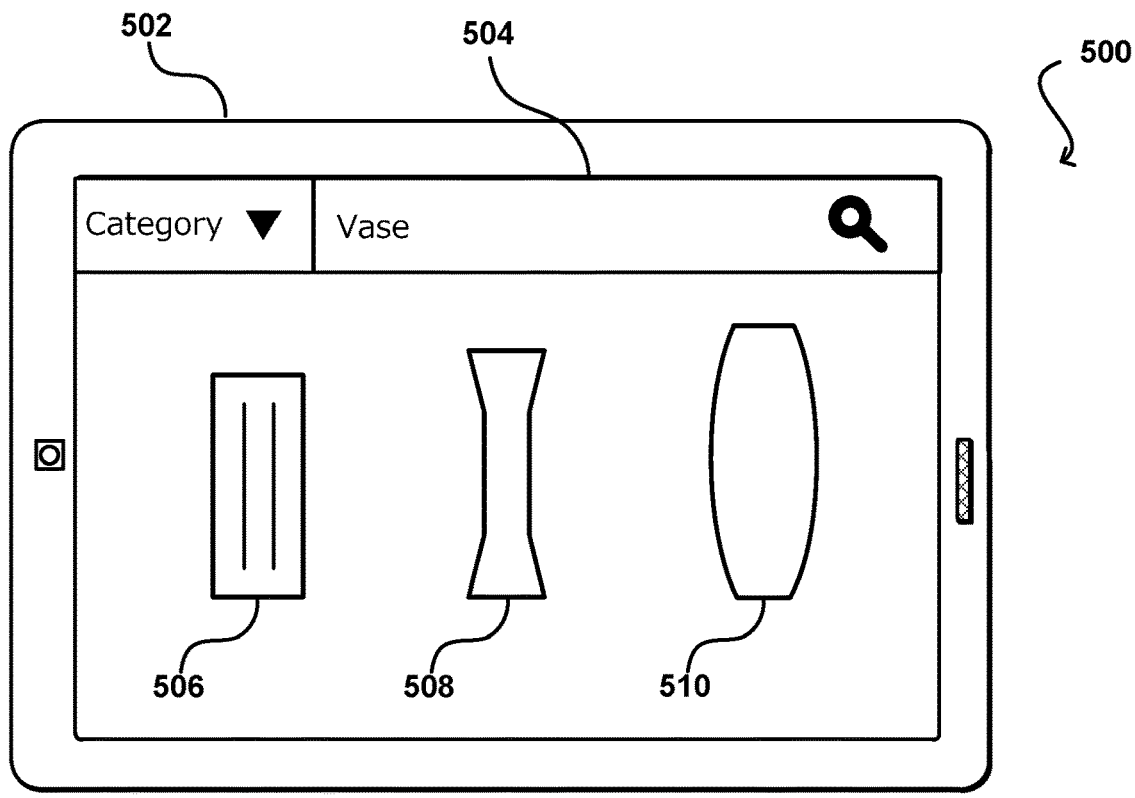
FIGS. 5(a) and 5(b) illustrate example interface displays that can be presented in accordance with various embodiments.
Figure 5B:
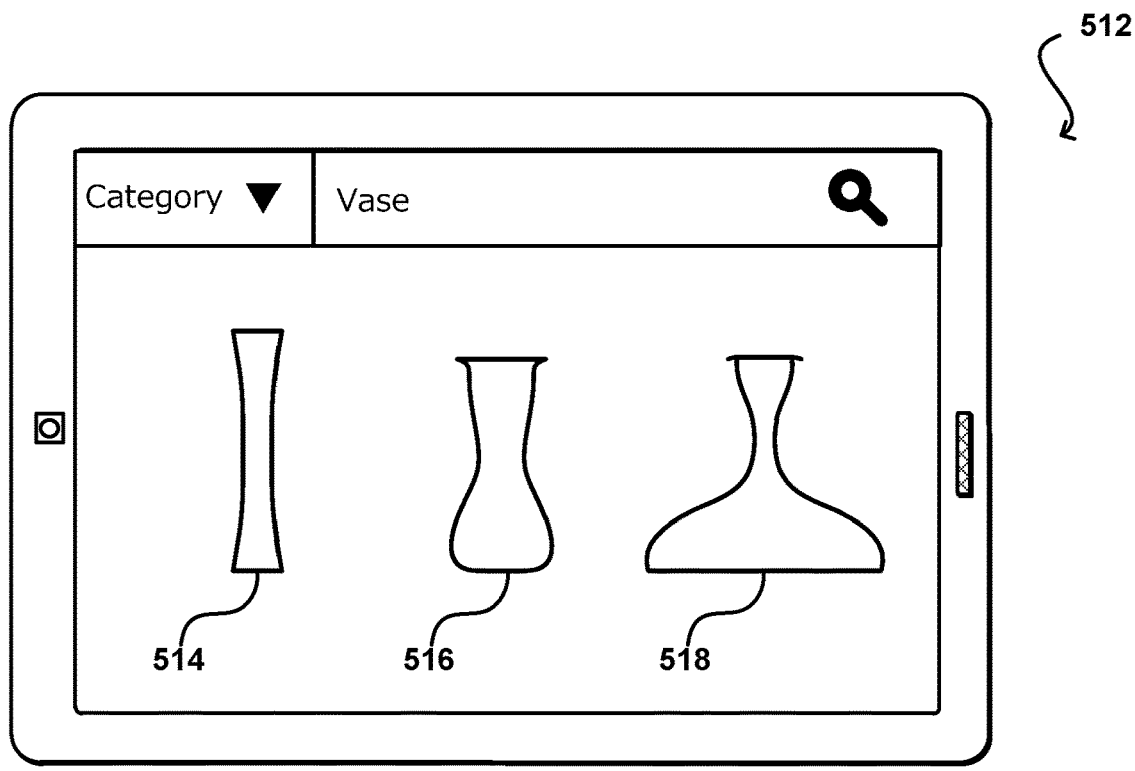

FIGS. 5(a) and 5(b) illustrate example interface displays 500 and 512 that can be presented in accordance with various embodiments. As shown in FIG. 5, a computing device 502 can display a search interface 504 that enables a user to search for and browse various objects. In this example the user has searched for "Vase" and a number of representative images 506, 508, 510 have been displayed. In some embodiments, the representative images may be shown in addition to a list of items responsive to the query. As shown in FIG. 5, the representative images can each correspond to a different category of vase, such as rectangular 506, tapered 508, and round 510. A user can select one of the representative images to refine their search. As shown in FIG. 5(b), the user has selected tapered vase 508 and is now shown images corresponding to items within that sub-category. In some embodiments, images 514, 516, 518 can be representative images for sub-sub-categories of vases which, when selected would provide a further refined search. In some embodiments, the images 415, 516, 518 can correspond to items within the sub-category tapered vases.

Figure 6:
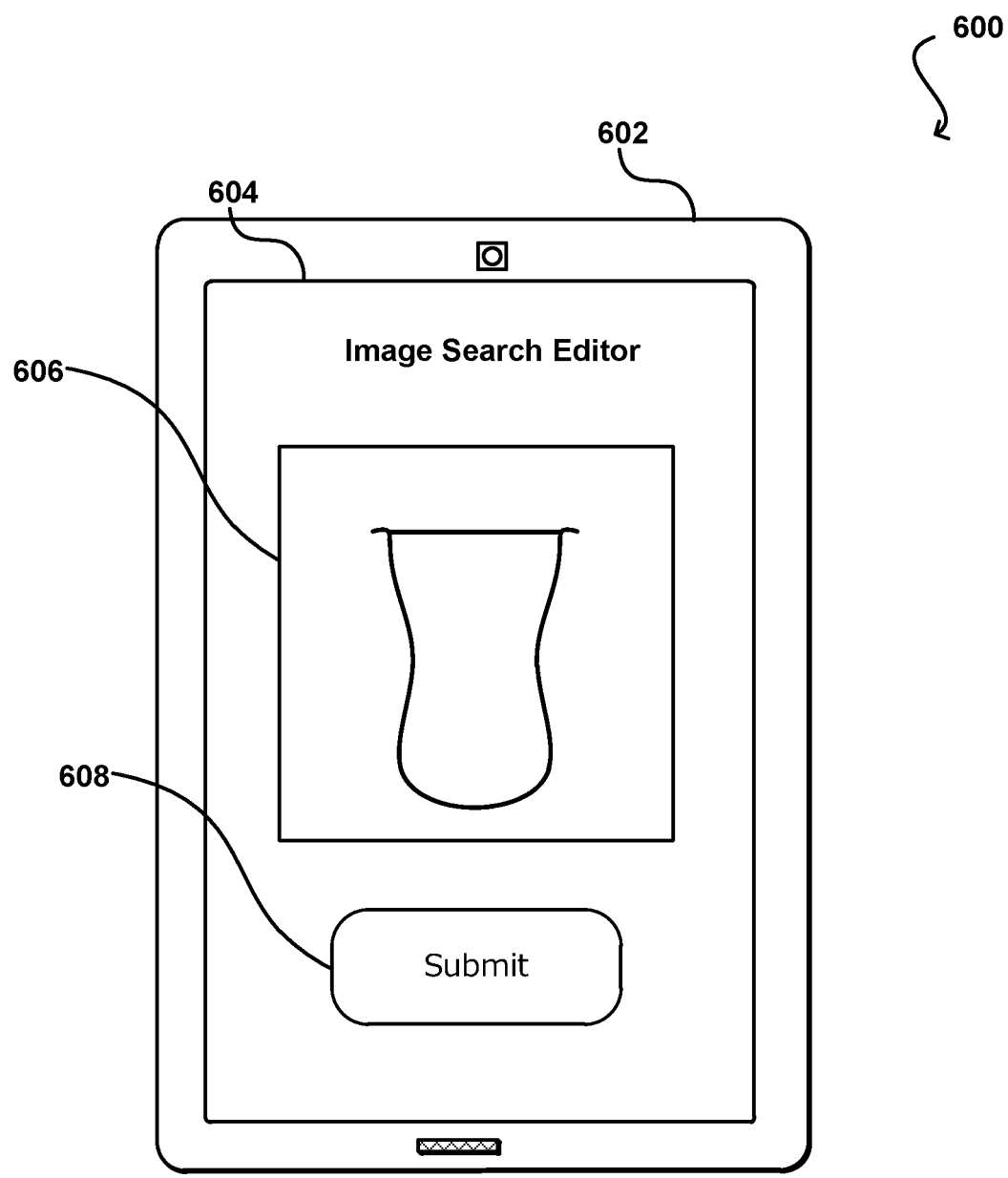
FIG. 6 illustrates an example search interface display that can be presented in accordance with various embodiments.

FIG. 6 illustrates an example search interface display 600 that can be presented in accordance with various embodiments. Embodiments discussed above include beginning a search with a text query and refining the search by selecting representative images related objects or categories of objects. In the example of FIG. 6, a user may draw a shape that is then matched to a representative image and corresponding category or sub-category of objects. As shown in FIG. 6, computing device 602 can display an image search editor interface 604. The image search editor interface can include a drawing area 606 in which a user may draw an outline of an object. For example, as shown at 606, the user has drawn an outline of a vase. The user can draw the outline on a touchscreen display using the user's finger, a stylus, or other apparatus. In some embodiments, the user can take a picture of an object, outline, shape, or other depiction of an object and use that captured image data as a search input. Once the user has provided the outline, the user can select submit 608 to begin the search. In some embodiments, image aggregation component can calculate a difference metric between the outline 606 provided by the user and the representative images 218. A matching representative image can be determined using a match threshold for the difference metric. The corresponding category or sub-category to the matching representative image, and one or more images belonging to that category or sub-category, can then be displayed to the user. In some embodiments, the user may draw multiple different visual characteristics to define a search. For example, a user may draw a shape of an object followed by a design of a pattern or other visual characteristic which may be used to refine the user's search. In some embodiments, search editor interface 604 may present one or more visual characteristic refinement options which may be selected to further refine the search. For example, various textures may be presented (e.g., through a drop down menu or other interface element) which may be selected to refine the user's search.

Figure 7:
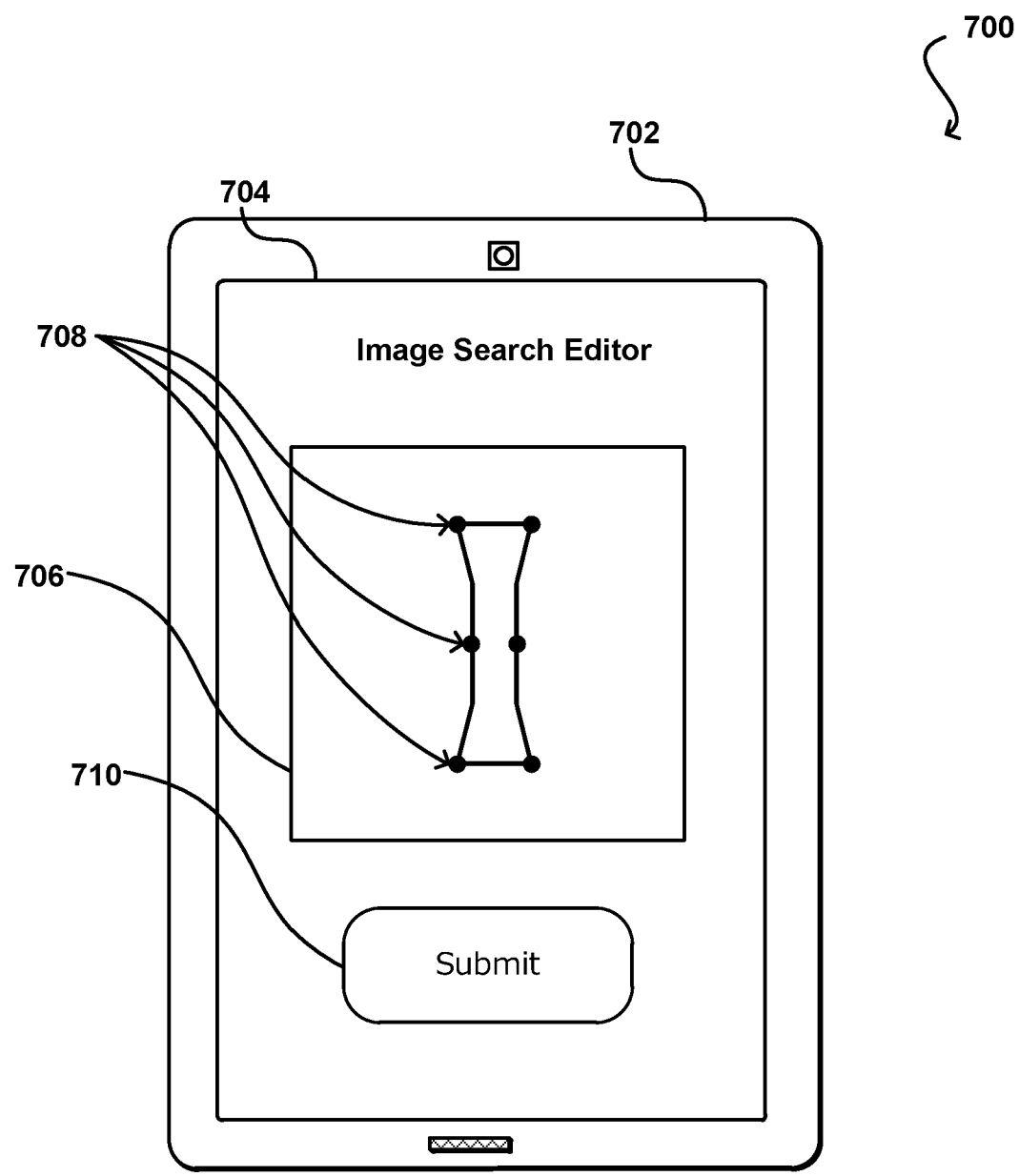
FIG. 7 illustrates another example search interface display that can be presented in accordance with various embodiments.

FIG. 7 illustrates another example search interface display 700 that can be presented in accordance with various embodiments. As shown in FIG. 7, computing device 702 can display an image search editor interface 704. The image search editor interface can include an editor area 706 in which a representative image responsive to the user's query may be displayed. For example, as shown at 706, a representative image of a tapered vase is displayed. As shown in FIG. 7, one or more touch points 708 can be added to the representative image. Each touch point 708 can be selected by the user and dragged to adjust the dimensions of the representative image. The user can drag the touch points on a touchscreen display using the user's finger, a stylus, or other apparatus. Once the user has modified the representative image, the user can select submit 710 to refine the search. In some embodiments, image aggregation component can calculate a difference metric between the modified image 706 adjusted by the user and the representative images 218. A matching representative image can be determined using a match threshold for the difference metric. The corresponding category or sub-category to the matching representative image, and one or more images belonging to that category or sub-category, can then be displayed to the user.

Figure 8:
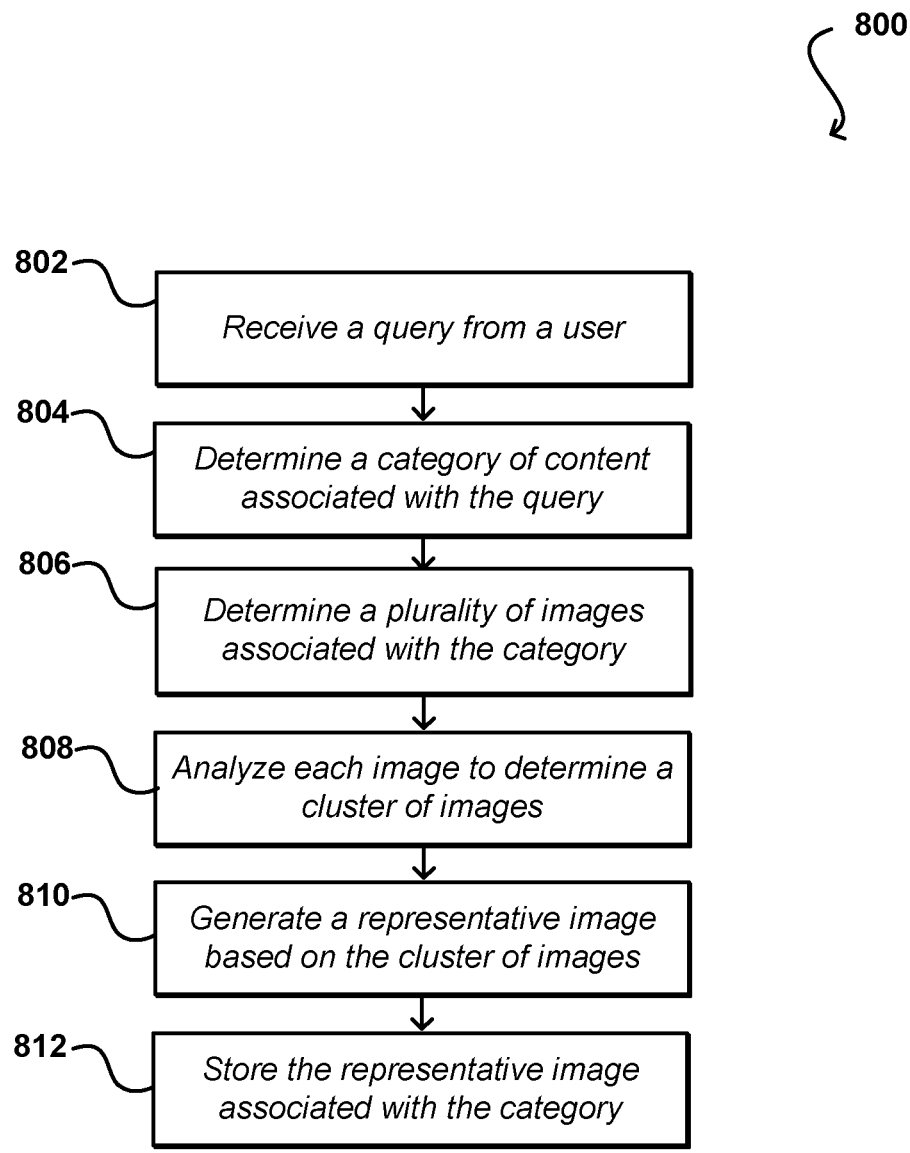
FIG. 8 illustrates an example process for generating a representative image that can be used in accordance with various embodiments.

FIG. 8 illustrates an example process 800 for generating representative images that can be utilized in accordance with various embodiments. It should be understood that there can be additional, fewer, or alternative steps performed in similar or alternative orders, or in parallel, within the scope of the various embodiments unless otherwise stated. In this example, a query can be received 802 from a client computing device. Based on the query, a category of content can be determined 804. In some embodiments, at least one data store can be searched based on the query and a category can be identified using a category tree or other organizational structure.

A plurality of images associated with the category can be determined 806. The images can be retrieved from the data store that was searched, from an image data store associated with the category tree, or from another data source. Each image of the plurality of images can be analyzed 808 to determine at least one cluster of images associated with the plurality of images. As discussed, each cluster may be determined based on a shape associated with each image.

In some embodiments, clusters within a set of images may correspond to a sub-category of images. Each image in the at least one cluster of images can be tagged with a label associated with the at least one sub-category. If sub-categories have not been defined in a corresponding category tree, the tags may be used to update the category tree.

A representative image can be generated 810 based on the cluster of images. For example, a first average image associated with the at least one cluster of images can be generated. A difference metric may then be calculated between each image in the at least one cluster of images and the average image. Images that are associated with a difference metric that is greater than a threshold may then be removed from the cluster and a second average image can be generated. As discussed, this process of aggregating and culling images can be repeated until a deviation measured across the difference metrics for the images in the cluster is below a threshold. The representative image may then be stored 812 associated with the at least one category.

In some embodiments, one or more transformations can be applied to the representative image. For example, a first image corresponding to an object can be identified and a second image, that is a rendering of the first image, can be received. For example, the second image can be an artist's rendering of the first image. A set of transformations can then be determined by comparing the first image to the second image. This set of transformations can be applied to each representative image.

In some embodiments, a representative image may have already been generated for a given category of content. When a query is received, one or more representative images responsive to that query can be identified and can be displayed in response to the query.

Figure 9:
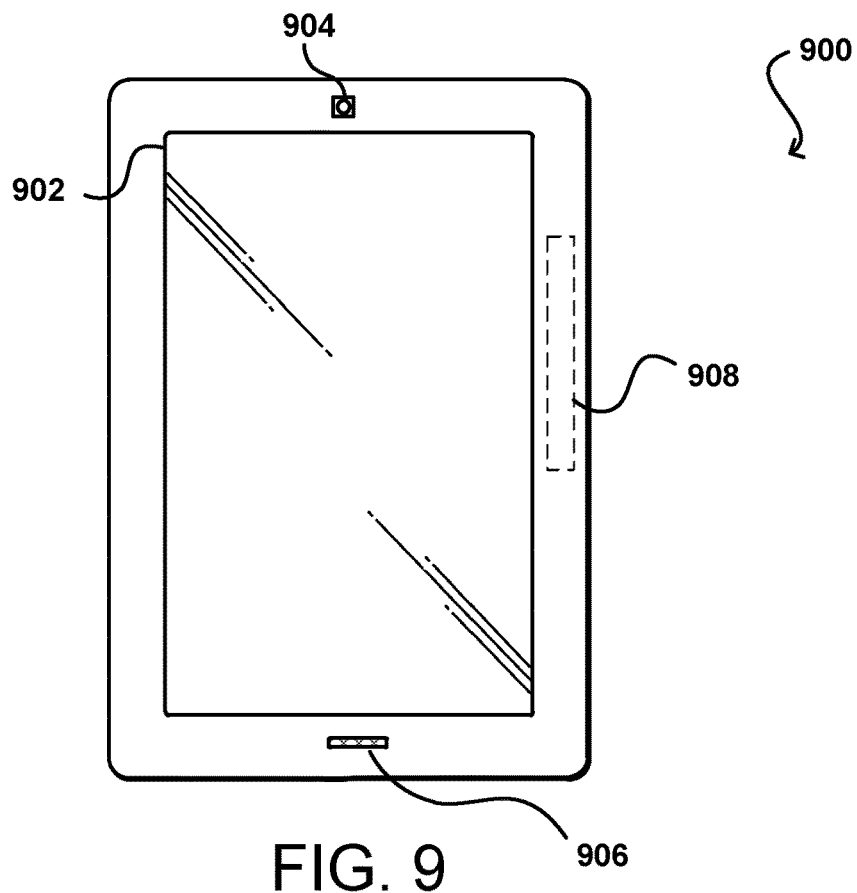
FIG. 9 illustrates an example device that can be used to implement aspects of the various embodiments.

FIG. 9 illustrates an example electronic user device 900 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 900 has a display screen 902 on the front side, which under normal operation will display information to a user facing the display screen (e.g., on the same side of the computing device as the display screen). The computing device in this example includes at least one camera 904 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video. The example computing device 900 also includes at least one microphone 906 or other audio capture device capable of capturing audio data, such as words or commands spoken by a user of the device. The example computing device 900 also includes at least one communication mechanism 908, such as may enable the device to utilize a wired and/or wireless connection to communicate over at least one network, such as a cellular network, the Internet, and the like.

Figure 10:
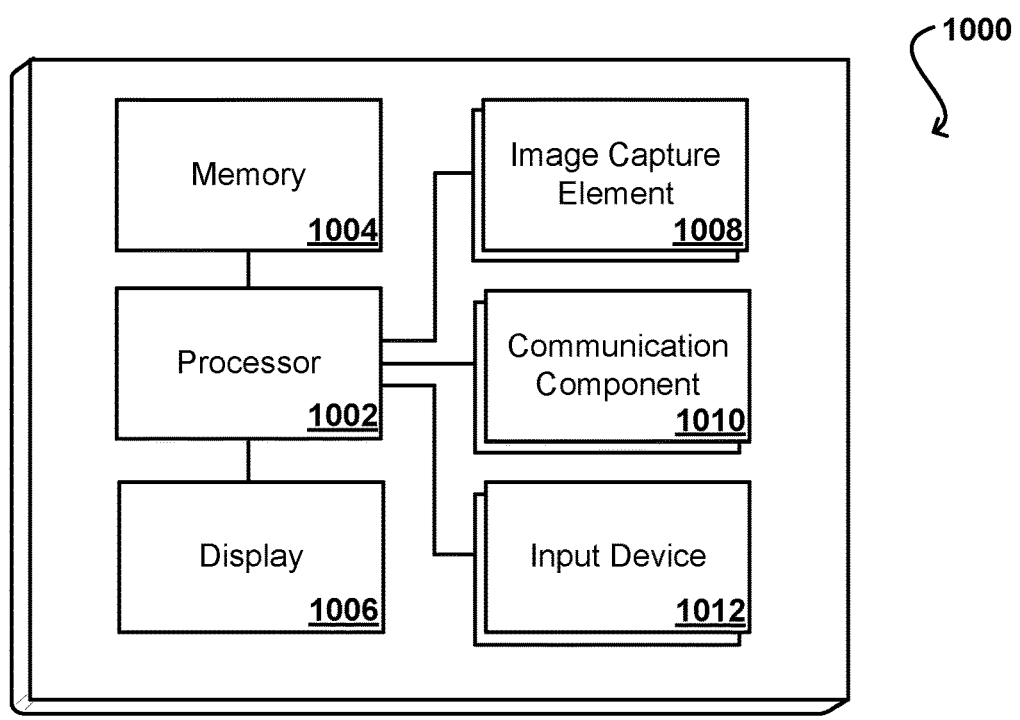
FIG. 10 illustrates example components of a client device such as that illustrated in FIG. 9.

FIG. 10 illustrates a logical arrangement of a set of general components of an example computing device 1000 such as the device 1000 described with respect to FIG. 9. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one image capture element 1008 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. The example device similarly includes at least communication component 1010, such as a Wi-Fi, Bluetooth, RF, wired, or wireless communication system. The device in many embodiments can communicate with a network, such as the Internet, and may be able to communicate with other such devices. In some embodiments the device can include at least one additional input device 1012 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

Figure 11:
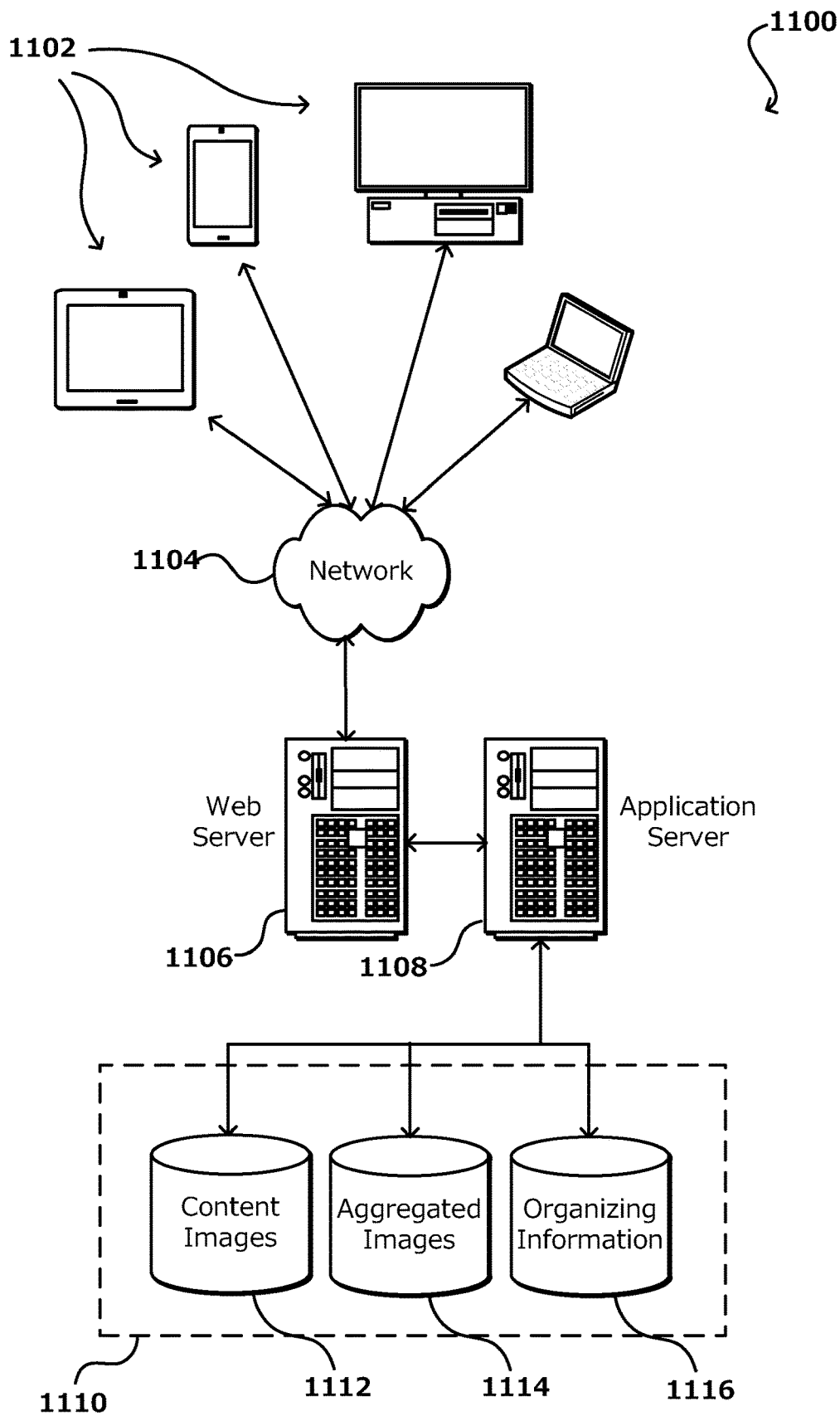
FIG. 11 illustrates an example environment in which various embodiments can be implemented.

In accordance with various embodiments, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes electronic client devices 1102, which can include any appropriate device operable to send and receive requests, messages or information over networks 1104 and convey information back to an appropriate device. Examples of such client devices include personal computers, cell phones, handheld messaging devices, laptop computers, set-top boxes, personal data assistants, electronic book readers and the like. The networks can include any appropriate network, including a telephone network provided by a telecommunication operator, an intranet, the Internet, a cellular network, a local area network, wireless network, or any other such network or combination thereof. The network could be a telephone network, a "push" network, a "pull" network, or a combination thereof. Wireless networks often include communication modes such as data transfer/text messaging. The system guarantees delivery of the message with failures being identified and the message stored in the network until the destination is available. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 1106 in the form of HTML, XML or another appropriate structured language in this example. The handling of all requests and responses, as well as the delivery of content between the client devices 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content 1112 received from services, other data stores, or other sources. The data store is also shown to include a mechanism for storing aggregated images 1114 which may be generated using the content images 1112. Organizing information 1116, such as category trees or other organizing structures, may also be maintained. It should be understood that there can be other information that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user can submit a search query to a search service provider. In this case, the data store might access the user information to identify features that correspond to one or more terms in the search query based on the user's demographic information.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a query from a client computing device;
searching at least one data store based on the query;
determining at least one category, of a plurality of predetermined categories, that is associated with the query;
determining a plurality of images associated with the at least one category;
analyzing each image of the plurality of images to determine at least one cluster of images associated with the plurality of images;
generating a first aggregate image associated with the at least one cluster of images, wherein the first aggregate image maintains or enhances features that are common to the at least one cluster of images, and wherein the first aggregate image diminishes or removes features that vary between each of the at least one cluster of images;

calculating a difference metric between each image in the at least one cluster of images and the first aggregate image;

removing a subset of images from the at least one cluster of images, wherein the difference metric associated with each image in the subset of images is greater than a threshold;

generating, after removing the subset of images, a second aggregate image associated with the at least one cluster of images, wherein the second aggregate image maintains or enhances features that are common to the at least one cluster of images, and wherein the second aggregate image diminishes or removes features that vary between each of the at least one cluster of images; and storing the second aggregate image as a representative image associated with the at least one category.

2. The computer-implemented method of claim 1, further comprising:

identifying a first image corresponding to an object;

receiving a second image, the second image being a rendering of the first image;

determining a set of transformations by comparing the first image to the second image; and applying the set of transformations to the representative image.

3. The computer-implemented method of claim 1, wherein the at least one cluster of images is associated with at least one sub-category and wherein the representative image is associated with the at least one sub-category.

4. The computer-implemented method of claim 3, wherein each image in the at least one cluster of images is tagged with a label associated with the at least one sub-category.

5. A computer-implemented method, comprising:

receiving a plurality of images, each image associated with a content item from at least one category of content of a plurality of predetermined categories of content;

analyzing, using at least one processor, each image of the plurality of images to determine at least one cluster of images associated with the plurality of images;

generating a first aggregate image associated with the at least one cluster of images, wherein the first aggregate image maintains or enhances features that are common to the at least one cluster of images, and wherein the first aggregate image diminishes or removes features that vary between each of the at least one cluster of images;

calculating a difference metric between each image in the at least one cluster of images and the first aggregate image;

removing a subset of images from the at least one cluster of images, wherein the difference metric associated with each image in the subset of images is greater than a threshold;

generating a representative image based on the at least one cluster of images, wherein the representative image maintains or enhances features that are common to the at least one cluster of images, and wherein the representative image diminishes or removes features that vary between each of the at least one cluster of images;

storing the representative image associated with the at least one category of content; and causing the representative image to be displayed in response to a query returning at least one item from the at least one category of content.

6. The computer-implemented method of claim 5, further comprising:

receiving a query from a client computing device;

searching at least one data store based on the query;

determining the at least one category of content associated with the query.

7. The computer-implemented method of claim 5, wherein the at least one cluster is determined based on a shape associated with each image.

8. The computer-implemented method of claim 5, further comprising:

receiving a subsequent query;

identifying a plurality of representative images associated with a plurality of sub-categories responsive to the subsequent query; and causing the plurality of representative images to be displayed in response to the subsequent query.

9. The computer-implemented method of claim 5, further comprising:

identifying a first image corresponding to an object;

receiving a second image, the second image being a rendering of the first image;

determining a set of transformations by comparing the first image to the second image; and applying the set of transformations to the representative image.

10. The computer-implemented method of claim 5, wherein the at least one cluster of images is associated with at least one sub-category and wherein the representative image is associated with the at least one sub-category.

11. The computer-implemented method of claim 10, wherein each image in the at least one cluster of images is tagged with a label associated with the at least one sub-category.

12. A computing system, comprising:

at least one processor; and a memory device including instructions that, when executed by the at least one processor, cause the computing device to:

receive a plurality of images, each image associated with a content item from at least one category of content of a plurality of predetermined categories of content;

analyze, using at least one processor, each image of the plurality of images to determine at least one cluster of images associated with the plurality of images;

generate a first aggregate image associated with the at least one cluster of images, wherein the first aggregate image maintains or enhances features that are common to the at least one cluster of images, and wherein the first aggregate image diminishes or removes features that vary between each of the at least one cluster of images;

calculate a difference metric between each image in the at least one cluster of images and the first aggregate image;

remove a subset of images from the at least one cluster of images, wherein the difference metric associated with each image in the subset of images is greater than a threshold;

generate a representative image based on the at least one cluster of images, wherein the representative image maintains or enhances features that are common to the at least one cluster of images, and wherein the representative image diminishes but does not remove features that vary between each of the at least one cluster of images;

store the representative image associated with the at least one category of content; and display the representative image in response to a query returning at least one item from the at least one category of content.

13. The computing system of claim 12, wherein the instructions, when executed, further cause the computing device to:

receive a query from a client computing device;

search at least one data store based on the query;

determine the at least one category of content associated with the query.

14. The computing system of claim 12, wherein the at least one cluster is determined based on a shape associated with each image.

15. The computing system of claim 12, wherein the instructions, when executed, further cause the computing device to:

identify a plurality of representative images associated with a plurality of sub-categories responsive to the subsequent query; and cause the plurality of representative images to be displayed in response to the subsequent query.

16. The computing system of claim 12, wherein the instructions, when executed, further cause the computing device to:

identify a first image corresponding to an object;

receive a second image, the second image being a rendering of the first image;

determine a set of transformations by comparing the first image to the second image; and apply the set of transformations to the representative image.

17. The computing system of claim 12, wherein the at least one cluster of images is associated with at least one sub-category and wherein the representative image is associated with the at least one sub-category.

18. The computing system of claim 17, wherein each image in the at least one cluster of images is tagged with a label associated with the at least one sub-category.

* * * * *